BY
ATTORNEYS

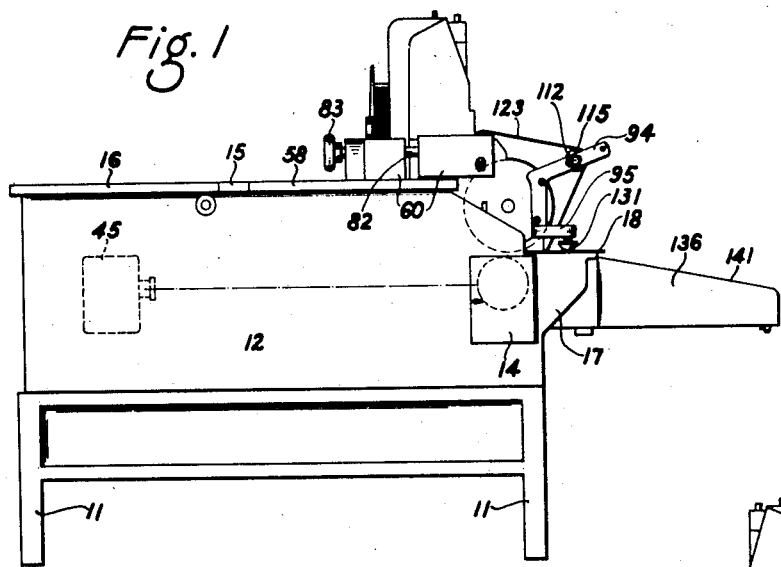
Fig. 1
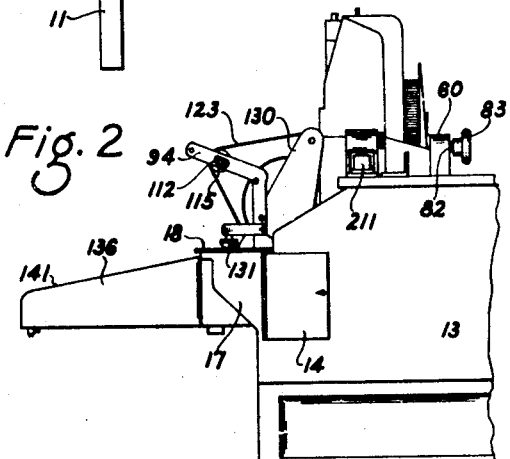
Fig. 2
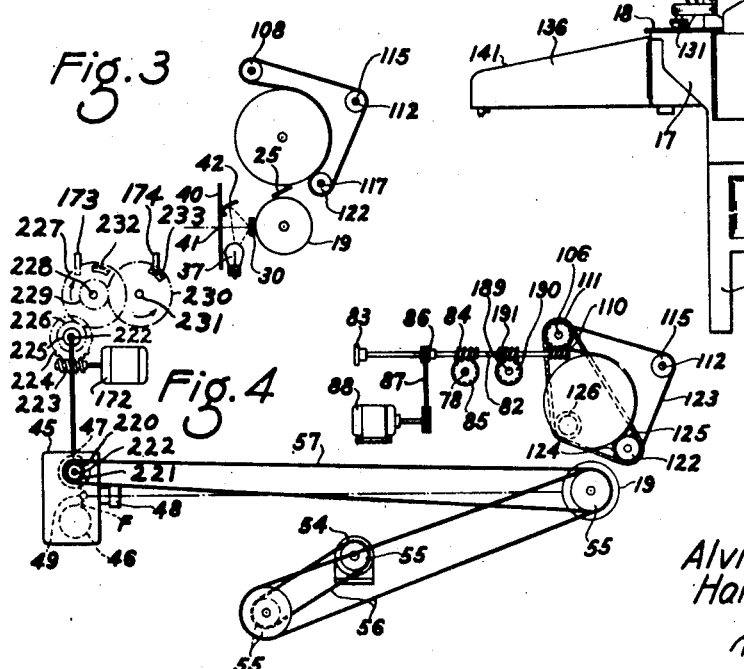
Fig. 3
Fig. 4
Alvin E. Schubert
Harvey P. Hintz
INVENTORS
BY
ATTORNEYS Alvin E. Schubert
Harvey P. Hintz
INVENTORS

Feb. 8, 1949.  A. E. SCHUBERT ET AL  2,461,185
RECORD HANDLING AND COPYING APPARATUS
Filed Jan. 8, 1943  4 Sheets-Sheet 3
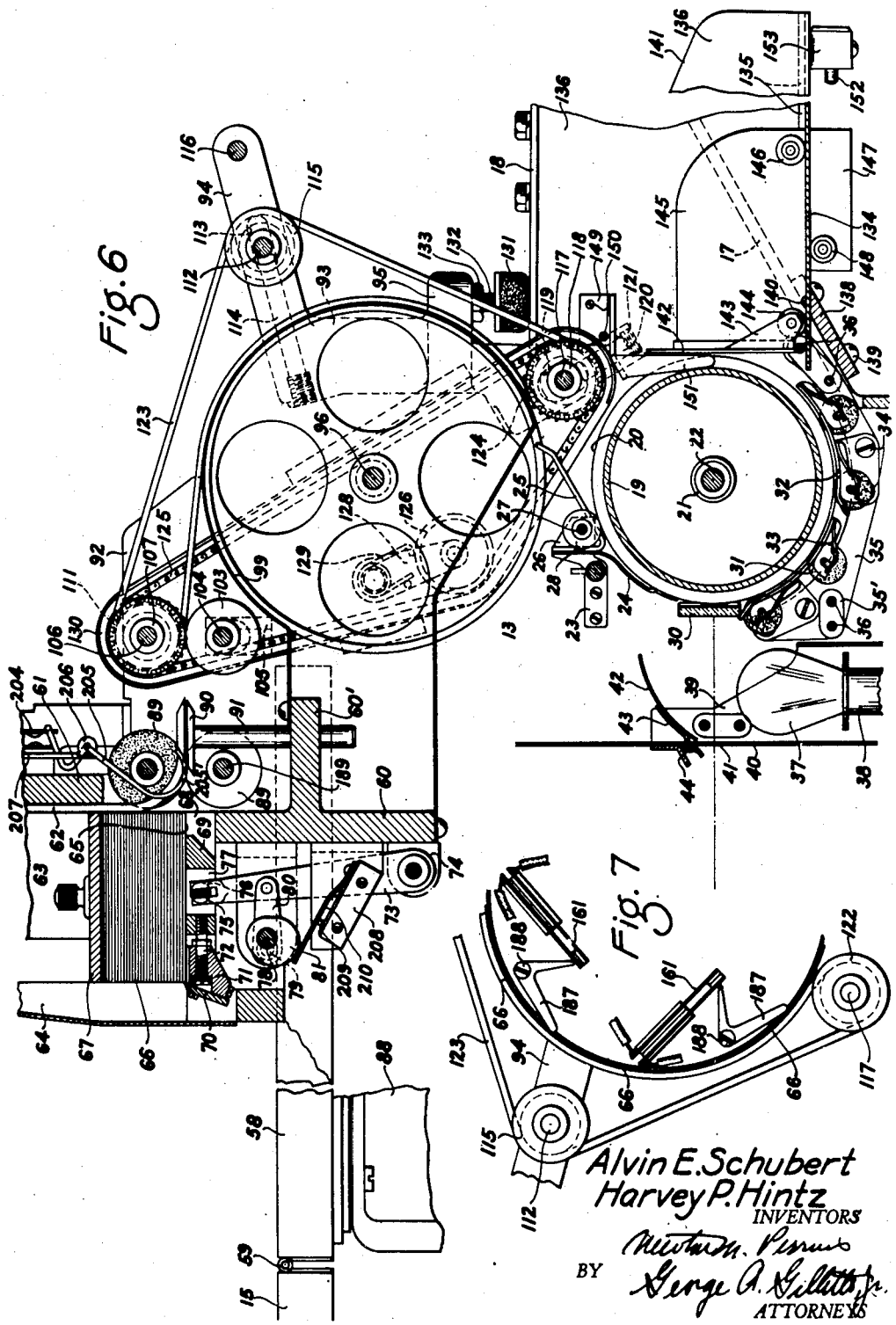
Alvin E. Schubert
Harvey P. Hintz
INVENTORS
BY
ATTORNEYS Feb. 8, 1949.   A. E. SCHUBERT ET AL   2,461,185
RECORD HANDLING AND COPYING APPARATUS
Filed Jan. 8, 1943   4 Sheets-Sheet 4
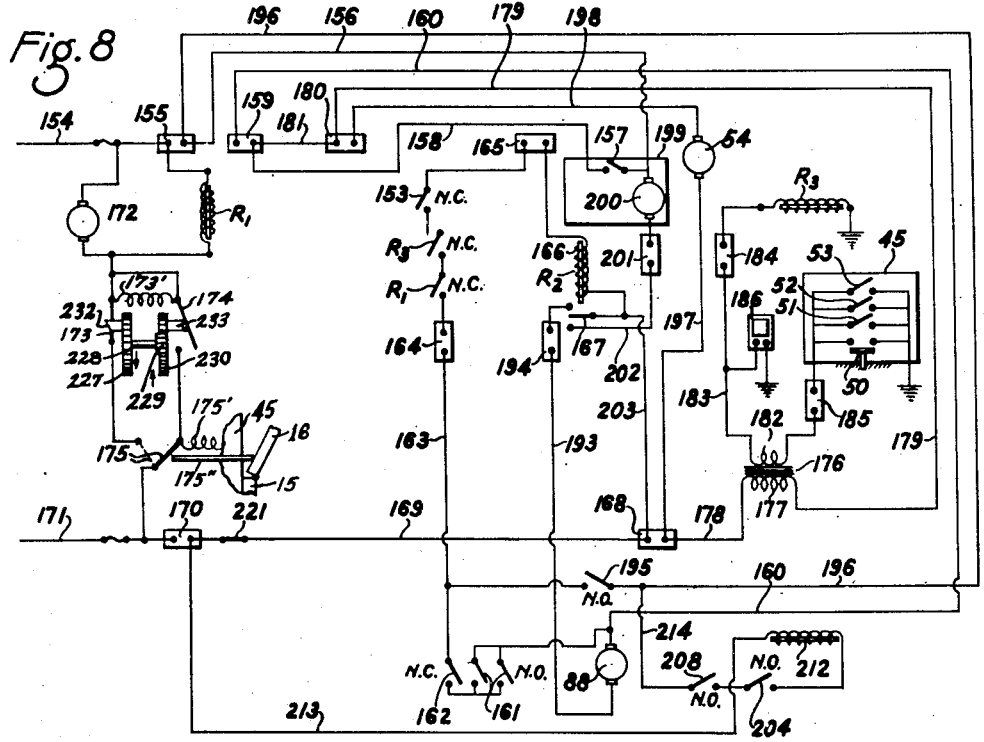
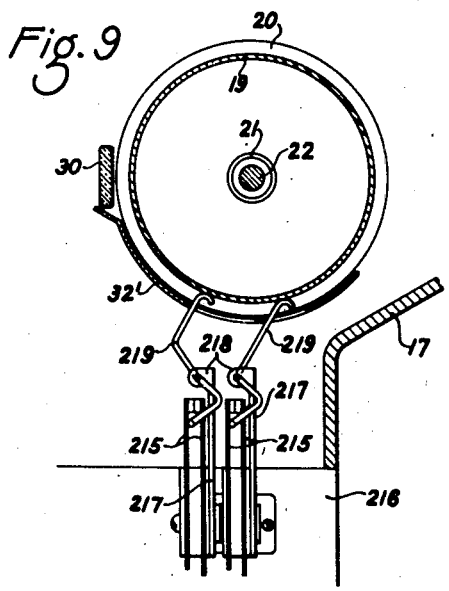
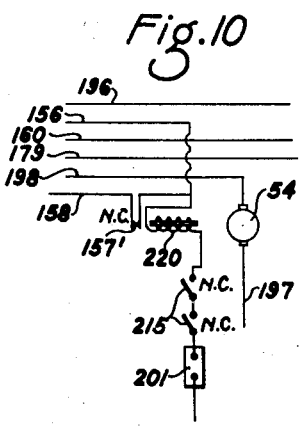
Alvin E. Schubert
Harvey P. Hintz
INVENTORS
BY
George A. Gillett, Jr.
ATTORNEYS Patented Feb. 8, 1949

2,461,185

UNITED STATES PATENT OFFICE 2,461,185

RECORD HANDLING AND COPYING APPARATUS

Alvin E. Schubert and Harvey P. Hintz, Rochester, N. Y., assignors to Eastman Kodak Company, Rochester, N. Y., a corporation of New Jersey Application January 8, 1943, Serial No. 471,706

29 Claims. (Cl. 88—24)

The present invention relates to an apparatus for handling and copying records and more particularly to an apparatus through which records may be rapidly moved and photographically copied without alteration or change in sequence.

While fully automatic record handling and photographic copying apparatus are known, such apparatus are deficient in one or more respects in that their speed of operation may be comparatively slow, the sequence of the records handled and copied may be changed, the records may not be continuously fed into or removed from the respective feeding and discharging stations, and/or interruption of operation seriously affects or eliminates the photographic copying. Another outstanding fault of known apparatus is that the feeding means and photographic copying machine are arranged so that the records can not be fed from the bottom of a stack, leaving the top of the stack free for addition of other records, without complicating the feeding means or operation of the photographic copying machine.

The primary object of the present invention is the provision of a record handling and photographic copying machine capable of high speed operation without disturbing the sequence of the records and having automatic controls responsive to a predetermined condition so that operation of the apparatus may be interrupted without affecting the photographic copying of the records.

Another object of the invention is the provision of a record handling and copying apparatus including a feeding means which may be stopped and including a control means whereby the operation of the copying machine is continued until all of the records therein have been properly photographed.

A further object is the provision of a record handling and copying machine including a feeding means conveniently arranged for adjustment or inspection or repair and/or including a receiving means for accepting records which have been photographed without disturbing their original sequence.

Still another object is the provision in a record handling and photographic copying apparatus of one or more control means responsive to manual operation, to an auxiliary film winding cycle, to improper spacing or absence of records from the feeding means, to an abnormal condition of the camera in the copying machine and/or to a full condition of the record receiving means whereby the feeding means is first rendered inoperative to stop the feeding of records and then the copying machine is shut down only after all of the records therein have been properly photographed.

A still further object is the arrangement of a feeding means including a feeder and conveyer with common drive means with respect to a copying machine having a drive means operating in synchronism with said common drive means and whereby said feeder, conveyer, and common drive means may be adjusted or inspected and conveniently stopped prior to shut-down of the photographic copying machine which continues to operate until all of the records therein have been photographed.

Other and further objects of the invention will be suggested to those skilled in the art by the following description.

The aforementioned and other objects of the invention are embodied in a record handling and photographic copying apparatus which comprises generally a feeding means, a photographic copying machine, a receiving means, and a plurality of controls responsive to a predetermined condition and operating first to interrupt the feeding means and then to shut down the copying machine only after the records therein have been photographed and preferably discharged. Said feeding means is composed of an intermittent feeder for removing records from the bottom of a stack with their record bearing face downward and of a conveyer having an arcuate path and for moving the records from the feeder and delivering them to the copying machine with their record bearing face upward. The copying machine is preferably of the continuous type and in which the records or documents are moved continuously through a photographic field and in which the sensitized film is moved continuously in an exposure position in a photographic camera. A common drive means, preferably a synchronous motor, is operatively connected to said feeder and conveyer and a second drive means, also preferably a synchronous motor, is connected to drive the copying machine in synchronism with the feeding means. The receiving means includes a platform, a follower plate and an abutment for accepting records from the copying machine and arranging them edgewise upon the platform with their record bearing face toward the front of the pack. The control means is responsive to manual operation, auxiliary film winding, and abnormal condition in the feeding or receiving means or in the camera and is preferably a control circuit including switches for interrupting the same under any of said conditions and for maintaining an operating circuit for the common drive means or motor for the feeding means. Interruption of said control circuit also interrupts the operating circuit for the common drive means and establishes a second control means or circuit which is adapted after a predetermined interval or after all records have been photographed in the copying machine to stop the driving means or motor of the copying machine. While the record handling and copying apparatus of the invention is illustrated and described with respect to the handling and copying of cards for an accounting machine of the Hollerith type, it should be understood that the invention is equally applicable to be used in the handling and photographing of other types of records, such as checks, letters, bills, and etc.

Reference is hereby made to the accompanying drawings wherein similar reference characters designate similar elements and wherein:

Fig. 1 is a side elevation of a record handling and copying apparatus according to the invention.

Fig. 2 is a fragmentary side elevation of the apparatus from the side opposite to that shown in Fig. 1.

Fig. 3 is a diagrammatic representation of the document path from the conveyer and through the copying machine.

Fig. 4 is a diagrammatic illustration of the drives for the feeding means, copying machine and camera.

Fig. 6 is a fragmentary vertical longitudinal section taken on the line 6—6 of Fig. 5 through the apparatus and particularly showing details of the feeding means, copying machine and receiving hopper.

Fig. 7 is a fragmentary vertical section through the conveyer on the line 7—7 of Fig. 5 and particularly showing the arrangement of record controlled switches therein.

Fig. 8 is a wiring diagram showing the various control and operating circuits according to the invention.

Figure 5:
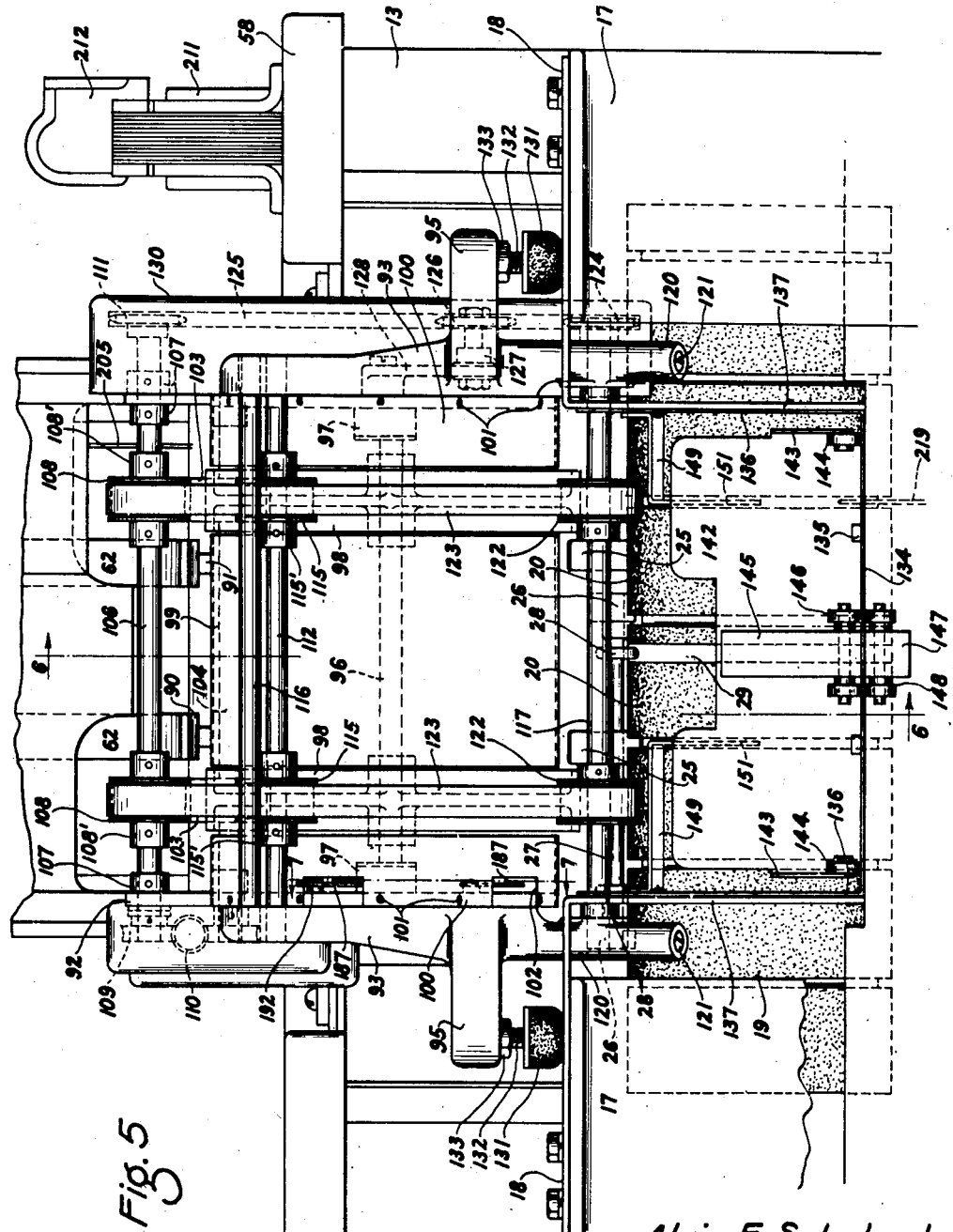
Fig. 5 is a fragmentary front elevation of the record handling and copying machine showing particularly the conveyer and receiving means.

Fig. 9 is a fragmentary vertical section through the document feed of the copying machine and showing a modified form of the control means for rendering the copying machine inoperative only after all records have been photographed therein, and Fig. 10 is a fragmentary wiring diagram illustrating the manner in which the modified control means of Fig. 9 is incorporated in the wiring diagram of Fig. 8.

In the illustrated embodiment of the invention the photographic copying machine may assume any of the several known forms but is preferably of the continuous type. Said copying machine is enclosed in a casing provided with an opening at the front upper portion thereof and includes a four-legged standard 11, side walls 12 and 13 each provided with a hinged door 14, a top crosspiece 15, and a hinged rear cover 16. At the front of the machine the casing is provided with a pair of brackets 17 supporting a horizontal ledge 18. The document feed of the copying machine includes a rotatable member preferably in the form of a drum 19 having axially spaced document engaging surfaces 20, preferably made of cork, and rotatably mounted by ball bearings 21 on a shaft 22. Brackets 23 mounted on side walls 12 and 13 support a guide shield 24 which carries forwardly extending and upwardly inclined guide strips 25 and also a pair of bearing blocks 26. A shaft 27 is journaled in said blocks 26 and carries two rollers 28, see Fig. 5, one engaging the document engaging surfaces 20 of drum 19 to one side of the document path and the other engaging a fiber band 29 in one of the document engaging surfaces 20, the second mentioned roller 28 providing a friction drive to the back of the document being fed onto the drum 19. A transparent strip 30 preferably of glass is mounted in the casing adjacent the document engaging surfaces 20 of drum 19 and holds the documents against the drum surface during copying in the photographic field. The document path of the copying machine from said photographic field consists of the document engaging surfaces 20 on the drum 19 and a plurality of rollers 31 mounted on the back of arcuate guide plates 32 and spring pressed through openings therein by springs 33 against said surfaces 20. The arcuate guide plates 32 are mounted by means of screws 34 upon side plates 35 fastened to the side walls 12 and 13 by bolts 36 threaded into reinforced portions 35' of plates 35. The entrance to the document feed of the photographic copying machine is thus provided between the surfaces 20 on drum 19 and the guide strips 25 and is located adjacent the opening in the casing for the copying machine.

The aforementioned document field may be illuminated in any known manner but is preferably illuminated by a bank of incandescent lamps 37 mounted in sockets 38 and within a metal housing having fixed side walls 39 and a fixed back wall 40 which is provided with an exposure slot 41. An arcuate reflector 42 is mounted upon a bracket 43 hinged at 44 to said back wall 40 and normally spring pressed into the position shown. For removal or insertion of incandescent lamps 37 the reflector 42 may be moved upwardly and is then returned to its operative position in which it directs the light from the lamp bank into the photographic field. The outstanding advantage of this arrangement of the lamp bank and reflector is that the lamps are mounted in the upright position without appreciably reducing the illumination at the photographic field and since the lamps 37 are being burned in the position for which they are designed the normal life of the lamps is obtained. It has been found from experience that burning the lamps in an inclined position considerably shortens their life.

The camera 45 is of standard construction having a supply film roll 46, a take-up roll 47 and an objective lens 48. A film strip F extends from the supply roll 46 to the take-up rolls 47 over a drum 49 and said camera 45 is equipped in the usual manner with a normally open switch 50 adapted to be closed unless the camera 45 is in proper position and normally open switches 51, 52 and 53 adapted to be closed respectively when the supply film roll 46 is depleted, when the take-up film roll 47 is full, and when there is loss of tension in the film strip F extending between rolls 46 and 47.

The driving means for the copying machine comprises a motor 54, preferably of the synchronous type, and connected by a series of pulleys 55 and belts 56 to said drum 19. The camera 45 or film therein is continuously driven in a known manner at a speed determined by the document speed, reduction, and etc. and such drive is illustrated diagrammatically by a belt 57 extending between the drum 19 and the pulley 220 which is connected by a one-way clutch 221 to the shaft 222 of the take-up roll 47. The operation of the copying machine is not unusual and documents introduced into the entrance of the document feed or between drum 19 and guide strips 25 with the record bearing face upward will be photographed at considerable reduction onto the film F in the camera 45.

The feeding means broadly comprises an intermittent feeder and a continuous conveyer with an arcuate path, both mounted upon a carriage also carrying a common drive means for the feeder and conveyer. Such carriage comprises a front cover 58 preferably connected by a hinge 59 to the top cross-piece 15 of the casing for the copying machine and supporting a feeder frame 60.

The supply hopper of the feeder is formed by a front wall 61 of frame 60 and carrying polished tracks 62, by side walls 63 and by rear uprights 64 also having polished surfaces. The feeder frame 60 has a document supporting platform 65 on which a stack of documents 66 may be placed and a cover weight 67 is placed on top of the document stack 66 in the usual fashion. Said document platform 65 is provided with a pair of guideways 68 for feeder heads 69. A picker assembly comprising a knife 70 mounted on a bushing 71 is rotatably fastened to feeder head 69 by a swivel 72. An arm 73 is pivotally mounted on a bracket 74 of feeder frame 60 and has a slotted free end engaging flats 75 on a rod 76 extending through an opening 77 in the feeder head 69. A crank shaft 78 carries crank pins 79 and a connecting rod 80 extends between crank pin 79 and arm 73. Said crank shaft 78 also carries a cam 81 for a purpose to be later described. A drive shaft 82 is journaled in the feeder frame 60 and carries a knob 83 for manual rotation thereof. Said drive shaft 82, see Fig. 4, carries a worm 84 meshing with a worm wheel 85 on said crank shaft 78 and also carries a pulley 86 connected by a belt 87 to the pulley of a motor 88, preferably of the synchronous type.

When the motor 88 is energized drive shaft 82 and crank shaft 78 are rotated and arm 73 and feeder head 69 are reciprocated from said crank shaft 78 through the connecting rod 80. The knives 70 of the picker assemblies on the feeder heads 69 are adjusted so as to engage the edge of only the lowermost document or card 66 on the platform 65 and reciprocation of the feeder head 69 by arm 73 moves such lowermost document 66 between the rollers 89 and into the guiding throat formed by the lower end of polished track 62 and by a polished guide member 90 mounted on a post 91 on the feeder frame 60. The lower roller 89 is driven and is mounted upon a shaft 189 carrying a worm wheel 190 meshing with a worm 191 on the drive shaft 82. The swivel mounting of the picker assemblies permits aligning of the knives with the edges of the documents or cards 66 which may be slightly curved.

The continuous conveyer has an arcuate path and receives the documents with their record bearing faces downward from the intermittent feeder just described, moves the documents continuously in spaced relation through said arcuate document path and delivers the documents with their record bearing faces upward into the entrance of the document feed of the copying machine. Said conveyer is mounted between side plates 92 which are mounted upon and extend from the feeder frame 60 and each of which plates 92 carries a bracket 93 composed of arm 94 and a foot 95. A shaft 96 is journaled in bearings 97 and carries wheels 98 having their peripheries covered with a friction material, such as rubber. Polished and fixed guide members are mounted in between said wheels 98 and between wheels 98 and side plates 92. Specifically, a polished guide member 99 has its upper end bolted to a ledge 60' of feeder frame 60, has its other end bolted adjacent bracket 74 to said feeder frame 60 and has a cylindrical intermediate portion concentric with but slightly below the peripheries of wheels 98. Polished fixed guide members 100 also have surfaces substantially concentric with but below the peripheries of wheels 98 and are fastened along their edges to side plates 92 by screws 101, the left end guide member 100 is provided with recesses 102 as shown in Fig. 5 for a purpose to be described later. A pair of idler rollers 103 are mounted upon a transverse shaft 104 journaled at each end in adjustable brackets 105 on side plates 92.

The driving assembly of the continuous conveyer comprises a pair of endless belts extending around a series of pulleys and bearing against a part of the periphery of the wheels 98. There are three pairs of pulleys, one of which is driven. A shaft 106 is journaled in bearings 107 mounted in side plates 92 and carries a pair of pulleys 108 freely rotatable on shaft 106 between collars 108' and in spaced relation on shaft 106 in alignment with wheels 98. A worm wheel 109 is mounted upon one end of shaft 106 and meshes with a worm 110 on the end of drive shaft 82 and a sprocket 111 is mounted on the other end of said shaft 106. A shaft 112 is mounted within slots 113 in arms 94 and an adjustable screw 114 extends through arm 94 into the slot 113 with its end abutting against said shaft 112. The pulleys 115 are also freely rotatable on shaft 112 between collars 115' in alignment with pulleys 108 and wheels 98. A stay rod 116 is connected between the outer ends of the arms 94. A shaft 117 is journaled in ball bearings 118 which are slidably mounted within elongated slots 119 in extensions 120 of the arms 94. Set screws 121 extend through extensions 120 into slots 119 to engage the outside of ball bearings 118 and to urge said ball bearings 118 against springs, not shown, within slots 119 and extensions 120. A pair of pulleys 122 are pinned to shaft 117 in spaced relation thereon and also in alignment with the wheels 98 and the other pulleys 115 and 108. A pair of endless belts 123 each encircle said pulleys 108, 115 and 122 with the belt run between pulleys 108 and 122 bearing against the peripheries of wheels 98 to form a circular or arcuate document path within the continuous conveyer.

The common drive means for the intermittent feeder and continuous conveyer includes the shaft 82 and the worms thereon for driving the crank shaft 78 of the feeder and the shaft 106 of the conveyer. The conveyer drive also includes a spocket 124, an endless chain 125 which encircles sprockets 111 and 124 and which is tensioned by an idler sprocket 126 rotatably mounted in a ball bearing 127 on the end of an arm 128 pivoted on a side plate 92 and urged by a coil spring 129 to press idler sprocket 126 and the endless chain 125 in a clockwise direction as viewed from Fig. 6. Thus, the endless belts 123 are driven only at one point or by the pair of pulleys 122 and the belts 123 are placed under tension in those portions contacting wheels 98 or the record 66, the return and inactive run of the belts 123 including any slack that may be therein. A sheet metal housing 130 is mounted upon a side plate 92 and encloses the chain drive just described of the continuous conveyer.

The carriage assembly including the feeder, conveyer and common drive means therefor, fills the opening in the casing of the copying machine and being hinged at 59 may be readily swung upwardly for inspection, adjustment and/or repair of the feeder, conveyer and/or document feed of the copying machine. The operative position of such carriage assembly may be varied by adjustable means comprising resilient pads 131 mounted on the ends of screws 132 threaded into arms 94 and held in an adjusted position by lock nuts 133. The angular position of a record or card being discharged from the conveyer may be varied by either or both of two adjustments. The pads 131 may be threaded into or out of arms 94 to change the angular relation between the exit of the continuous conveyer and the entrance to the document feed of the copying machine and/or the set screws 121 may be adjusted to change the position of pulleys 122 with respect to the peripheries of wheels 98 and to open or close the exit bight of the document feed of the conveyer thus varying the angular position of the record or card leaving the continuous conveyer and entering the document feed of the copying machine between the guide strips 25 and the document engaging surfaces of drum 19.

The receiving means for the records is located adjacent the exit of the document feed of the copying machine and is adapted to accept the records consecutively without changing their sequence. Such receiving means includes a hopper 141 comprising a platform 134 having a pair of polished rails 135 and having side flanges 136 fastened to depending flanges 137 of the ledge 18. Said platform 134 is also supported by a cross member 138 fastened to bracket 17 by bolts 139, see Fig. 6, screws 140 being threaded through platform 134 and into cross member 138 with the heads of screws 140 below the upper surfaces of polished rails 135. A follower assembly comprises a follower plate 142 having ears 143 on which rollers 144 are mounted and a center support 145 carrying rollers 146 and having a depending portion 147 extending below platform 134 and carrying rollers 148 engaging the undersurface of said platform 134. Said follower assembly is consequently freely movable along said platform 134 with plate 142 in an upright position and said follower assembly is biased or normally urged toward the periphery of the document feeding drum in a well understood manner, preferably by a weight, not shown herein. As a result, said follower plate 142 is normally urged against the document engaging surfaces 20 of drum 19 or against a record or card therebetween.

An abutment means for the records or cards is positioned within the receiving means to engage the leading edge of such records and to arrange them in edgewise relationship within the receiving hopper 141. Such an abutment comprises polished flanges 149 mounted by screws 150 on the side flanges 136 of the receiving hopper and spaced from the card engaging surfaces of polished rails 135 a distance corresponding to the dimensions of the records in their direction of travel through the apparatus. The records 66, as shown, are moved width-wise through the copying machine so that the spacing of the abutment or flange 149 above the rails 135 will be slightly more than the width of said records 66. For the purpose of insuring removal of the record from the document feed of the copying machine a stripper means may be provided. Specifically, the stripper arms 151 are mounted on flanges 149, being preferably formed integral therewith and extend downwardly into the spaces formed between the document engaging surfaces 20 on the drum 19.

The operation of the receiving means will now be described. The distance from the document feed exit or last roller 31 to the contact between follower 142 and document engaging surfaces 20 of feeding drum 19 is less than the width of the records or cards 66 and the records being discharged from the document feed of the copying machine will engage the surface of upright follower plate 142 or the surface of the preceding record which is maintained in upright position by the follower assembly. The bias on the follower assembly holds the record against the document engaging surfaces 20 of feeding drum 19 so that there is a tendency drive of the document upwardly between the edges of stripper arms 151 and the follower plate 142 or the last card of the pack stacked edgewise on polished rails 135. When the leading edge of the record abuts against flange 149 the tendency drive is overcome and the record is held in that position between stripper arms 151 and follower plate 142 until the next record comes along. Each succeeding record moves the follower plate outwardly and when the receiving hopper 141 is full the depending portion 147 of the follower assembly will abut against the plunger 152 of a normally closed switch 153 to open the same. The function of said switch 153 will be explained later.

In a record handling and photographic copying apparatus operating at high speed, of the order of 400 records or cards per minute, it is very necessary that several automatic controls be provided so that the apparatus will be shut down upon the occurrence of any abnormal or undesirable condition so that such condition may be corrected. On the other hand, the very nature of a photographic copying machine, particularly of the continuous type, makes it very desirable to complete the photographic copying of all records in the machine to avoid improperly exposed copies, partial images of documents, etc. Therefore, the control system of the invention is established so that upon the happening of any predetermined condition, including manual shut off of the machine, the feeding means will be stopped immediately but the copying machine will continue to operate until all the records therein have been photographed.

The aforementioned sequential control is accomplished by control means responsive to manual operation and/or to a predetermined condition of the feeding means, copying machine, auxiliary film cranking means and/or document receiving means and is arranged or adapted first to stop the feeding means and subsequently to stop the copying machine only after all records therein have been photographed. Such control means may consist of two systems, one responsive to the aforementioned conditions and for interrupting operation of the feeding means and the other responsive to stopping of the feeding means and for shutting down the copying machine after all the documents have been photographed. Said other control means may operate to shut down the copying machine after a predetermined interval or may be responsive to an absence of records in the document path from the photographic field of the copying machine. As shown, the control means supervises two driving means, one for the copying machine and the other for the feeding means and arranged so that the controlling means responsive to a predetermined condition including manual operation interrupts the driving means for the feeding means and the other control means which is operative only after all documents have been photographed in the copying machine to interrupt or render inoperative the driving means for the copying machine.

The primary control means which is responsive to the various predetermined conditions is preferably provided as a control circuit including in series a relay and a plurality of switches which are normally closed but which are open upon the occurrence of a predetermined condition or manual operation. Such a control circuit is shown in Fig. 8 as follows: From the main supply line 154, connector terminal 155, wire 156, switch 157, wire 158, connector terminal 159, wire 160, either one or both of normally open switches 161 which are connected in parallel, through a normally closed manual stop switch 162, wire 163, terminal 164, normally closed switch of relay $R_1$, normally closed switch of relay $R_3$, normally closed switch 153, terminal 165, the coil 166 of a relay $R_2$ operating a single pole double throw switch 167 normally closed in one position, wire 203, connector terminal 168, wire 169, main switch 221, terminal 170 and to the other main supply line 171. The relay $R_3$ is of a standard type which requires manual resetting after it has once been energized and opened for reasons to be explained later.

The copying machine is preferably provided with an auxiliary film advancing means for winding a predetermined length of film through the camera for the purpose of winding a leader or film exposed while loading the camera onto the take-up and also for winding a predetermined length of film or trailer onto the take-up prior to opening of the camera. Such auxiliary winding means may be automatically operated and may be constructed as shown in Schubert U. S. Patent No. 2,161,391, granted June 6, 1939. Such a film winding means is illustrated in Figs. 3 and 8 and comprises a winding motor 172 driving a worm gear 223 meshing with a worm wheel 224 which is mounted for co-axial rotation about the film winding shaft 222. Worm wheel 224 is connected through a second one-way clutch 225 to film winding shaft 222 and carries a spur gear 226 meshing with and driving a timing gear 227 on shaft 228. A pinion gear 229 is mounted to rotate with timing gear 227 and drives a second timing gear 230 rotatably mounted on a shaft 231. Said timing gear 227 carries a cam lug 232 adapted to engage and open switch arm 173 and timing gear 230 carries a cam lug 233 adapted to engage and open switch arm 174. The winding motor 172 is connected through either of cam operated switches 173 or 174, which are normally closed as by a spring 173', and through a single pole double throw switch 175 which is automatically moved from one position to the other by respective opening or closing of the rear cover 16 of the copying machine and to the main supply line 171. Said switch 175 is normally moved to the position shown in Fig. 8 by a spring 175' and a plunger 175'' is actuated upon movement of cover 16 to closed position and moves said double throw switch 175 to its other position which is indicated by dotted lines in Fig. 8. In operation when said cover 16 is closed, switch 175 is moved to complete the circuit through cam operated switch 173 and winding motor 172, such winding operation being interrupted after a predetermined length or leader of film has been wound through the camera by opening of said cam operated switch 173 which is accompanied by closing of the cam operated switch 174. When the cover 16 is open the switch 175 will be returned to the position shown in Fig. 8 whereupon winding motor 172 is again energized to wind a length of film or trailer through the camera of the copying machine until cam operated switch 174 is open. As shown, the timing gears 227 and 230 carrying cam lugs 232 and 233 for operating said switches 173 and 174 may be such as to provide for winding one length of film for the leader and another length of film, preferably longer, for the trailer. According to the invention the coil of relay $R_1$ is connected in parallel with winding motor 172 and so as to be energized and de-energized therewith upon the aforementioned operation of switches 173, 174 and 175. Since the switch of relay $R_1$ is in the control circuit, said switch of the relay $R_1$ and said control circuit will be closed when the coil of $R_1$ is deenergized or when the auxiliary film winding means is inoperative and said normally closed switch of the relay $R_1$ and the control circuit will be open when the coil of said relay $R_1$ is energized or when the auxiliary film winding means is operating.

The automatic control circuits for the camera of the copying machine are preferably of low voltage and a transformer 176 has its primary winding 177 connected at one side by a wire 178 to the connector terminal 168 and its other side connected through a wire 179 to a connector terminal 180, a wire 181, connector terminal 159, wire 158, switch 157, wire 156 and terminal 155 to the main supply line 154. The secondary winding 182 of transformer 176 has one side connected by a wire 183, connector 184 through the coil of a normally closed relay $R_3$ to ground, the other side of the secondary winding 182 being connected through a terminal 185 to one side of switches 50, 51, 52 and 53, the other side of said switches being connected to ground. As before described, said switches 50, 51, 52 and 53 are normally open but switch 50 is closed unless the camera 45 of the copying machine is located in its proper position and switches 51, 52 and 53 are closed when there is an insufficient film supply on roll 46, when take-up roll 47 is full, or when there is no tension on the film F within camera 45. As a result, when camera 45 is improperly located or when there is an undesirable film condition therein the circuit is closed through the secondary of transformer 182 and the coil of relay $R_3$ is energized to open the normally closed switch of said relay $R_3$, which switch is in the aforementioned control circuit. At the same time an audible or visual signal 186 may be energized to warn the operator that there is an undesirable condition with respect to the camera of the copying machine.

An automatic control is provided to stop the feeding means when there are no records or cards in the document path of the conveyer or when the records or cards are improperly spaced in said conveyer. Such a control means is shown in some detail in Figs. 5 and 7 and preferably comprises a pair of bell cranks 187 pivotally mounted by screws 188 on studs 192 on side plate 92, see Fig. 5, one arm of each bell crank 187 projecting through the recess 102 in polished guide member and into the document path of the conveyer, the other arms of each bell crank 187 being located to engage and close the switches 161. The bell cranks 187 are placed in spaced relation along the document path of the conveyer and are located so that at least one of said switches 161 will be closed when properly spaced records 66 are moving through said document path and so that both of said switches 161 will be open if there is improper spacing between said records 66 or if there are no records 66 in the document path of the conveyer. Specifically, said bell cranks 187 extend into the document path at a spacing of approximately one and a half card pitches from each other. As a result of this arrangement of bell cranks 187 and parallel connection of normally open switches 161 it will be evident that both switches will be open to interrupt the aforementioned control circuit when there are no cards in the document path of the conveyer or when the cards therein are improperly spaced or too far apart.

The common driving means for the feeding means includes feeding motor 88 as has already been described and such common driving means is rendered operative or inoperative by closing or interruption respectively of the aforementioned control means or circuit. The operating circuit for said common driving means includes said feeding motor 88 which has one side connected to wire 160 which may be traced back to the main supply line 154 and the other side of motor 88 is connected by a wire 163, terminal 164 through switch 167 of the relay R₂ when the coil 166 thereof is energized to terminal 168 which may be traced to the other main supply line 171. Consequently, when the primary control circuit is closed coil 166 of relay R₂ is energized and switch 167 thereof is moved to close the circuit through feeding motor 88 whereupon the intermittent feeder and continuous conveyer will be operated in a manner already described. On the other hand, interruption of the control circuit by opening of any of the switches therein will de-energize the coil 166 of relay R₂ and switch 167 will be opened to render inoperative the feeding motor 88 of the common driving means for the feeding means.

Since the record controlled switches 161 are both open when there are no cards in the continuous conveyer, or when the cards therein are improperly spaced, it is not possible to complete the primary control circuit and thereby complete the circuit for feeding motor 88 to start the intermittent feeder and conveyer and bring cards into position to close one of switches 161. Consequently, a normally open starting switch 195 has one side connected to wire 163 of the control circuit and the other side connected through a wire 196 through terminal 155 to the main supply line 154. Closing of said starting switch 195 will short-circuit the record or card operated switches 161 so that relay R₂ may be energized and the operating circuit for feeding motor 88 completed.

The driving means for the copying machine includes the motor 54 which is mechanically connected as already described to the feeding drum 19 and camera 45 of the copying machine and which is electrically connected at one side by a wire 197 to the connector 168, wire 169, and terminal 170 to the main supply line 171 and at the other side by a wire 198, terminal 180, wire 198, terminal 180, wire 181, terminal 159, wire 158, switch 157, wire 156 and terminal 155 to the main supply line 154. Thus, operation of the driving means for the copying machine or energization of motor 54 is controlled by the closing and opening of switch 157.

In its broadest aspect the invention contemplates any means or arrangement which initiates a cycle upon stopping of the feeding means and during which the copying machine remains operative until all records have been photographed. Specifically, two forms of such a control means are shown, one an interval timer for opening the operating circuit of motor 54 at a predetermined interval after its energization, and the other a relay coil energized to open said switch 157 after all documents have left the document feed leading from the photographic field of the copying machine.

Said control means may be provided as a control circuit including an interval timer 199 of known form and including timer motor 200 having one side connected through wire 166 and terminal 155 to main supply line 154 and having its other side connected through a terminal 201 and wire 202 through switch 167, in its normally closed position when the coil 166 of relay R₂ is de-energized, and through wire 203, terminal 168 thence to the main supply line 171. The interval timer 199 is set or arranged in a known manner so that after a predetermined interval following energization of timer motor 200 the switch 157 is opened, being closed immediately thereafter. Such opening of switch 157 not only interrupts the circuit to motor 54 but also interrupts the primary control circuit and the operating circuit for the feeding motor 88 so that it is not possible to operate the feeding means unless the copying machine is also operating.

A counter means is provided to indicate the number of records passing through the record handling and photographic copying apparatus and may be associated with any available part of the apparatus but is preferably associated with the intermittent feeder and rollers 89 and guide member 90 adjacent thereto. Such a counter means comprises a normally open switch 204 having a movable contact member which is operated by a spring wire feeler 205 centrally pivoted in a lug 206 on a plate 207 attached to the front wall 61 of the feeder frame 60. The upper end of feeler 205 is connected to the movable member of switch 204 while the lower end 205' is circularly bent and normally extends into the record path between the intermittent feeder and guide member 90. A normally open micro switch 208 has a plunger 209 and carries a leaf spring 210 extending into the path of cam 81 on the crank shaft 78 of the intermittent feeder, said cam 81 being designed to operate leaf spring 210 and plunger 209 to close switch 208 during one-half revolution of crank shaft 78 and then to open switch 208 during the other half of a revolution of crank shaft 78. A magnetic counter 211 of standard construction is mounted upon cover 58 and includes a solenoid 212 which for each energization moves the counter one unit. Said normally open switch 204 and micro switch 208 are connected in series with solenoid 212 which has its other side connected by a wire 213 to the connector terminal 170 on the line side of main switch 221. The other side of such counter circuit is connected by a wire 214 and wire 196 to the connector 155 and other main supply line 154. During a counting cycle the micro switch 208 is closed for half of the cycle and open for half of the cycle, such opening giving the ratchet or other member in the magnetic counter 211 time to retract or re-set for the next cycle. The normally open switch 204 is closed only when there is a card passing between rollers 89 and through guide member 90 so that even if the intermittent feeder is operating without any records or cards in the hopper thereof the counter will not be operated merely by opening and closing of the micro switch 208. In other words, in order to get a count, switch 208 must be closed by operation of the feeder and switch 204 must be closed by the presence of a card between the rollers 89. It should be noted that the counter circuit is connected on the line side of all controls or switches so that automatic or manual operation of the control does not necessarily de-energize solenoid 212 and cause a fallacious count, for instance, when the main switch 221 is opened and closed or when operation of the feeding means and copying machine is caused by any of the automatic controls.

The alternative control for interrupting the drive means of the copying machine after all records have been photographed therein may comprise a pair of normally closed switches 215 connected in series and mounted upon a suitable bracket 216 within the casing of the copying machine. A pair of supports 217 are also mounted on bracket 216 and have ears 218 in which wire feelers 219 are pivoted. Said feelers 219 have curved ends extending through spaced openings in an arcuate guide plate 32' adjacent the document discharge path of the copying machine. Said upper ends of the feelers 219 may extend into the space between the axially spaced document engaging surfaces 20 of the drum 19 whereupon the other ends of feelers 219 permit switches 215 to be normally closed. When a record or records in spaced relation move between drum 19 and guide plate 32' one or both of feelers 219 will be operated to open one or both of normally closed switches 215 and conversely when there is no document between drum 19 and guide plate 32' both of feelers 219 will be moved to the position shown and both of switches 215 will be closed. The control circuit for this modified form of the invention extends from the terminal 201 through switches 215 and through the solenoid 220 which is adapted to open the normally closed switch 157'. Thus, when switches 215 are both closed solenoid 220 will be energized to open switch 157' and interrupt the operating circuit of the motor 54 for the copying machine.

The operation of the record handling and photographic copying machine is as follows: The records 66 are stacked in the hopper of the intermittent feeder with their record bearing faces downward. The main switch 221 is closed and renders operative the driving means for the copying machine or establishes an operating circuit from main supply line 154 through terminal 155, wire 156, switch 157, interval timer 199 having re-set itself to close switch 157, through wire 158, terminal 159, wire 181, terminal 180, wire 198, copying machine motor 54, wire 197, terminal 168, wire 169, main switch 221 and terminal 170 to the other main supply line 171. However, since there are no records in the continuous conveyer both of switches 161 will be open and the primary control circuit including coil 166 of relay R₂ is de-energized so that switch 167 is in its normally closed position and the control circuit is established through the interval timer which after a predetermined interval, of the order of one or two seconds, sufficient to photograph all the records in the copying machine, causes switch 157 to open and shut down the motor of the copying machine. When the apparatus is to be started without any records in the conveyer switches 161 will be open, as just explained, and in order to start the apparatus it is necessary to close the normally open starting switch 195. Upon closing of said starting switch 195 a control circuit is established from main supply line 154 through terminal 155, wire 196, starting switch 195, wire 163, terminal 164, the switches of relays R₁ and R₃, normally closed switch 153, terminal 165, the coil 166 of relay R₂, wire 203, connector terminal 168, wire 169, main switch 221, terminal 170 to the other main supply line 171. Closing of the primary control circuit just traced energizes the coil 166 of relay R₂ and moves the switch 167 thereof to the position opposite its normally closed position and thus completes an operating circuit for the feeding means and which extends from main supply line 154 through terminal 155, wire 156, switch 157, which is closed at this time, wire 158, terminal 159, wire 160, feeding motor 88, wire 193, terminal 194, switch 167, wire 203, terminal 168, wire 169, main switch 221, terminal 170 to the other main supply line 171. Thus, the feeding motor 88 is energized and the common drive means for the intermittent feeder and continuous conveyer is operated.

The records 66 are fed with their record bearing face downward between rollers 89 and the passage of each record through the guide members 90 actuates feeler 205 to operate the magnetic counter. The documents from guide members 90 are fed between rollers 103 and belts 123 and between the periphery of wheels 98 and belts 123 through the arcuate path of the continuous conveyer which discharges the records with record bearing faces upward into the entrance of the document feed of the copying machine. The records are moved through the copying machine and photographed therein in a well understood manner, the records being moved continuously on the drum 19 and the film being moved continuously in the camera 45 and the records leaving the photographic field of the copying machine are delivered into the receiving means in a manner already explained. As soon as the first record closes one of the switches 161 the primary control circuit will be maintained therethrough and the starting switch 195 may be released to return to its normally open position without interrupting operation of the machine. However, if for any reason the records 66 or cards are improperly spaced in the continuous conveyer or are not passing through the continuous conveyer then both of switches 161 will be opened to interrupt the control circuit, cause interruption of the operating circuit for the feeding motor 88 and then after all of the documents have been photographed interrupting the circuit for the motor 54.

The interruption of said primary control circuit may be caused by the happening of any one of several predetermined conditions. For instance, the normally closed switch 162 may be operated or opened. The camera 45 may be improperly located in the copying machine so that switch 50 is closed to energize the coil of relay R₃ and open the switch thereof. The film supply may be depleted, the take-up film roll 47 may be full or there may be lack of tension on the film in the camera 45 to cause any one of switches 51, 52 or 53 to close, thus again energize the coil of relay R₃ and opening the switch thereof. Inasmuch as the abnormal condition in the camera 45 may only occur intermittently such as an accentric winding of the film on the take-up film roll 47 causing intermittent closing of the corresponding switch 53, relay R₃ is preferably of the manual re-set type so that once the switch of relay R₃ is open it must be re-set before the primary control circuit is again completed. The use of a manual re-set relay R₃ prevents resumption of operation in the event of a temporary correction of the film condition in or location of the camera 45. The receiving hopper may become full so that normally closed switch 153 is opened by abutment of depending portion 147 against the plunger 152 of said switch 153. The rear cover 16 may be opened to initiate operation of the auxiliary film advancing means and cause energization of the coil of relay R₁ which opens the switch thereof. Also immediately after closing of said rear cover 16 said auxiliary film advancing means is again energized with energization of the coil of relay R₁ and opening of its normally closed switch until the predetermined amount of film has been wound through the camera. Any of these conditions interrupts the primary control circuit.

Upon interruption of the primary control circuit the coil 166 of relay R₂ is de-energized and switch 167 moves to its normally closed position and also interrupts the primary control circuit and the operating circuit through feeding motor 88 so that the common drive means for the feeding means is rendered inoperative. Closing of switch 167 completes the circuit through the interval timer 199 which after a predetermined interval sufficient to photograph all of the documents in the copying machine opens switch 167 and de-energizes motor 54 to render inoperative the driving means for the copying machine. Alternatively, such closing of switch 167 may establish the secondary control circuit in the modified form of the invention so that after all of the documents have been photographed in the copying machine and switches 215 are closed then solenoid 220 is energized to open switch 167' and interrupt the operating circuit for motor 54 to render the driving means for the copying machine inoperative. As soon as the abnormal condition has been cleared the apparatus may resume operation in the manner already described.

Under normal conditions a single operator need merely to stack records in the hopper of the intermittent feeder and remove the photographed records from the hopper of the receiving means and one operator may attend to two or more of these record handling and photographic copying machines because the machine automatically shuts down upon the occurrence of any abnormal or undesirable condition and will remain so until that condition is corrected by the operator. However, such shut-down occurs in the sequence explained in that the feeding means is first rendered inoperative and then only after all records have been photographed is the copying machine stopped.

It is quite apparent that the present invention is susceptible of many variations within the spirit thereof and consequently the scope of the invention is not to be determined by the illustrated embodiments but rather by the scope of the claims which follows.

Having now particularly described our invention what we desire to secure by Letters Patent of the United States and what we claim is:

1. In an apparatus for handling and copying records, the combination with a casing provided with an opening, a photographic copying machine within said casing and including a camera adapted to contain a film and having a switch operated according to a film condition in said camera and including a document feed with its entrance adjacent said opening and having a rotatable member for moving records widthwise through and out of said document feed, a driving means for said copying machine, an auxiliary film-advancing means for winding a predetermined length of film through said camera, a carriage assembly on said casing adjacent to and filling said opening and carrying an intermittent record feeder, a continuous conveyer having an arcuate document path, adapted to receive records from said feeder and having its exit opposite the entrance of said document feed, and a common drive means operatively connected to said feeder and said conveyer and operating in synchronism with the aforementioned driving means, a receiving means having a platform adapted to support one or more records edgewise thereon and including a follower plate biased to move towards said rotatable member, adapted to hold a record in frictional engagement therewith, and movable to a position corresponding to a full condition of said receiving means, and an abutment spaced from said platform a distance corresponding to the width of a record and adapted to abut and stop the leading edge thereof, of a control circuit including in series a relay adapted to be opened when said switch in the camera is closed by a predetermined film condition therein, a second relay adapted to be opened when said auxiliary film-advancing means is operated, a pair of switches connected in parallel and adapted both to be opened when no records are in the document path of said feeding means, a starting switch for shunting said pair of switches, and a switch adapted to be opened when said member of the receiving means is moved to full position, an operating circuit interrupted by opening of said control circuit and rendering said common driving means inoperative, a second control circuit completed by the opening of the first-mentioned control circuit and adapted after all the records in said copy machine have been photographed to render inoperative the drive means therefor.

2. In an apparatus for handling and copying records, the combination with a copying machine for photographing records and including a camera having a film moving means and a switch operated according to a film condition in said camera, a driving means for said copying machine, an auxiliary film-advancing means for winding a predetermined length of film through said camera, a feeding means having a document path, carrying records in spaced relation therein and for delivering said records to said copying machine, a second driving means for said feeding means, and a receiving means for collecting the records discharged by said copying machine and including a member movable to a position corresponding to a full condition of said receiving means, of a control circuit including in series a relay adapted to be opened when said switch in the camera is closed by a predetermined film condition therein, a second relay adapted to be opened when said auxiliary film-advancing means is operating, a pair of switches connected in parallel and adapted both to be opened when no records are in the document path of said feeding means, a starting switch for shunting said pair of switches, and a switch adapted to be opened when said member of the receiving means is moved to full position, an operating circuit interrupted by opening of said control circuit and rendering said second driving means and said feeding means inoperative, a second control circuit completed by the opening of the first-mentioned control circuit and adapted after the records in said copying machine have been photographed to render inoperative the driving means therefor.

3. In an apparatus for handling and copying records, the combination with a casing provided with an opening, a photographic copying machine within said casing and having a document feed with its entrance adjacent said opening, adapted to receive each record to be copied with its record-bearing face upward, and including a rotatable member for discharging each record to the back of a pack of records with its record-bearing face toward the front of said pack, and a carriage assembly on said casing adjacent to and filling said opening and carrying a feeder adapted to feed single records horizontally from the bottom of a vertical stack with its record-bearing face downward, carrying a continuous conveyer having an arcuate path with its exit opposite the entrance of said document feed and for receiving each record from said feeder with its record-bearing face downward and delivering each record to said copying machine with its record-bearing face upward, and carrying a common drive means operatively connected to said feeder and said conveyer, of a second drive means in said casing operating in synchronism with said common drive means and operatively connected to said copying machine and the rotatable member thereof, a receiving means having a platform adapted to support one or more records edgewise thereon and including a follower plate biased to move toward said rotatable member and adapted to hold a record in frictional engagement therewith, an abutment spaced from said platform a distance corresponding to the dimension of the record in the direction of movement and adapted to abut the leading edge thereof and stop the record over said platform, and a stripper adjacent said rotatable member and adapted to direct a record from said rotatable member and into edgewise engagement with said abutment.

4. In an apparatus for handling and copying records, the combination with a copying machine for photographing records and comprising a camera adapted to contain a film, a record moving means for moving records past said camera, and a permanent drive connection from said record moving means to said camera and for continuously moving said film therethrough during continuous movement of said records by said record moving means, and a separate record handling means operably independent of said copying machine and for delivering records to said record moving means and copying machine, of a sequential control means for maintaining operation of said camera, drive connection and record moving means of the copying machine for an interval after said record handling means has stopped.

5. In an apparatus for handling and copying records, the combination with a copying machine having a record moving means and for photographing records, a record handling means including a feeding means for successively delivering records into said record moving means of the copying machine and including a receiving means for collecting the records discharged by said copying machine, of a sequential control comprising a primary control means manually operable and responsive to an abnormal condition of the materials in said copying machine and in said record handling means and operative to stop said feeding means and an interval control means responsive to said primary control means, providing an interval of operation of said copying machine and record moving means following stopping of said feeding means and of sufficient duration for copying of the records in said record moving means, and then stopping said copying machine and record moving means.

6. In an apparatus for handling and copying records, the combination with a copying machine having a record moving means and for photographing records, a record handling means including a feeding means for successively delivering records into said record moving means of the copying machine, of a sequential control comprising a primary control means responsive to an abnormal condition of the materials in said feeding means and operative to stop said feeding means and an interval control means responsive to said primary control means, providing an interval of operation of said copying machine and record moving means following stopping of said feeding means and of sufficient duration for copying of the records in said record moving means, and then stopping said copying machine and record moving means.

7. In an apparatus for handling and copying records, the combination with a copying machine having a record moving means and for photographing records, a record handling means including a feeding means for successively delivering records into said record moving means of the copying machine, of a sequential control comprising a primary control means responsive to an abnormal condition of the materials in said copying machine and operative to stop said feeding means and an interval control means responsive to said primary control means, providing an interval of operation of said copying machine and record moving means following stopping of said feeding means and of sufficient duration for copying of the records in said record moving means, and then stopping said copying machine and record moving means.

8. In an apparatus for handling and copying records, the combination with a copying machine having a record moving means and for photographing records, a record handling means including a feeding means for successively delivering records into said record moving means of the copying machine and including a receiving means for collecting the record discharged by said copying machine, of a sequential control comprising a primary control means responsive to an abnormal condition of the records in said receiving means and operative to stop said feeding means and an interval control means responsive to said primary control means, providing an interval of operation of said copying machine and record moving means following stopping of said feeding means and of sufficient duration for copying of the records in said record moving means, and then stopping said copying machine and record moving means.

9. In an apparatus for handling and copying records, the combination with a copying machine having a record moving means and for photographing records, and a conveyer for delivering records into said record moving means of the copying machine, of a sequential control comprising a primary control means responsive to an abnormal condition of the records in said conveyer and operative to stop said conveyer and an interval control means responsive to said primary control means, providing an interval of operation of said copying machine and record moving means following stopping of said conveyer and of sufficient duration for copying of the records in said record moving means, and then stopping said copying machine and record moving means.

10. In an apparatus for handling and copying records, the combination with a copying machine having a record moving means and for photographing records, a conveyer for delivering records into said record moving means of the copying machine, and a receiving means for collecting the records discharged by said copying machine, of a sequential control comprising a primary control means responsive to an abnormal condition of the records in said receiving means and operative to stop said conveyer and an interval control means responsive to said primary control means, providing an interval of operation of said copying machine and record moving means following stopping of said conveyer and of sufficient duration for copying of the records in said record moving means, and then stopping said copying machine and record moving means.

11. In an apparatus for handling and copying records, the combination with a copying machine having a record moving means and for photographing records, a conveyer for delivering records into said record moving means of the copying machine, and a feeder for removing single records from a pack thereof and moving each record successively into said conveyer, of a sequential control comprising a primary control means responsive to an abnormal condition of the materials in said copying machine and operative to stop said conveyer and said feeder and an interval control means responsive to said primary control means, providing an interval of operation of said copying machine and record moving means following stopping of said conveyer and feeder and of sufficient duration for copying of the records in said record moving means, and then stopping said copying machine and record moving means.

12. In an apparatus for handling and copying records, the combination with a copying machine for photographing records and including a camera having a film moving means, an auxiliary film-advancing means for winding a predetermined length of film through said camera, and a feeding means for successively delivering records into said copying machine, of an operating control circuit containing a switch for completing said circuit and causing operation of said feeding means, and an auxiliary film-advance control circuit energized for operation of said auxiliary film-advancing means and including an electromagnet for opening said switch to render said operating control circuit and said feeding means inoperative when said auxiliary film-advancing means is operating.

13. In an apparatus for handling and copying records, the combination with a copying machine for photographing records, comprising a record moving means and including a camera adapted to contain a film and having a switch operated according to a film condition in the camera, and a feeding means for successively delivering records into said record moving means of the copying machine, of operating control means including and responsive to said switch in the camera and adapted and constructed first to stop said feeding means and subsequently to stop said record moving means of the copying machine only after all records therein have been photographed.

14. In an apparatus for handling and copying records, the combination with a copying machine for photographing records, comprising a record moving means and including a camera adapted to contain a film and having a switch operated according to a film condition in the camera, and a feeding means for successively delivering records into said record moving means of the copying machine, of a control circuit including said switch in the camera and a relay coil, and a second control circuit including a switch opened by said relay coil and requiring manual closing and adapted when interrupted first to stop said feeding means and subsequently to stop said record moving means of the copying machine only after all records therein have been photographed.

15. In an apparatus for handling and copying records, the combination with a copying machine for photographing records, a driving means for said copying machine, a feeding means for successively delivering records to said copying machine, and a second driving means for driving said feeding means, of a control means responsive to a condition of the materials in said apparatus and operative to render said second driving means inoperative, and a second control means operative only when the first mentioned control means renders said second drive means inoperative and maintaining operation of the driving means for said copying machine until all the records in said copying machine have been photographed therein and for thereafter rendering inoperative the driving means for said copying machine.

16. In an apparatus for handling and copying records, the combination with a copying machine for photographing records, a driving means for driving said copying machine and including an operating circuit and a switch therein, a feeding means for successively delivering records to said copying machine, and a second driving means for driving said feeding means and including a second operating circuit, of a control circuit including a switch responsive to a predetermined condition of said apparatus and including a coil adapted when energized to hold said control switch in position to energize the operating circuit of said second driving means, and a second control circuit completed by opening of the first-mentioned control circuit and including a device operative only after all records in said copying machine have been photographed to open the switch in the operating circuit of the first-mentioned driving means to stop said copying machine.

17. In an apparatus for handling and copying records, the combination with a copying machine for photographing records, a driving means for said copying machine, a feeding means for successively delivering records to said copying machine, and a second driving means for driving said feeding means, of a relay having a coil and a single pole double-throw switch, a control circuit including a switch and the coil of said relay, an operating circuit closed by said relay switch when said control circuit is completed to energize said relay coil and for rendering said second driving means operative, a second control circuit completed by said relay switch only when the first-mentioned control circuit is open and including a switch operating device which is operative only after the records in said copying machine have been photographed therein, and a second operating circuit including a switch arranged to be opened by said switch operating device and for rendering inoperative the driving means for said copying machine.

18. In an apparatus for handling and copying records, the combination with a copying machine for photographing records, a driving means for said copying machine, a feeding means for successively delivering records to said copying machine, and a second driving means for driving said feeding means, of a control means responsive to a condition of the materials in said apparatus, and operative to render said second driving means inoperative, and a second control means made operative when the first mentioned control means renders said second driving means inoperative, maintaining operation of the driving means for said copying machine for a predetermined interval during which all of the records in said copying machine are photographed and then rendering inoperative the driving means for said copying machine.

19. In an apparatus for handling and copying records, the combination with a copying machine for photographing records, a driving means for driving said copying machine and including an operating circuit and a switch therein, a feeding means for successively delivering records to said copying machine, and a second driving means for driving said feeding means and including a second operating circuit and a control switch therein, of a control circuit including a switch responsive to a predetermined condition of said apparatus and including a coil adapted when energized to hold such control switch in position to energize the operating circuit of said second driving means, and a second control circuit completed by opening of the first-mentioned control circuit and including a timing device operative, after a predetermined interval during which all of the records in said copying machine are photographed, to open the switch in the operating circuit of the first-mentioned driving means to stop said copying machine.

20. In an apparatus for handling and copying records, the combination with a copying machine having a photographic field and a document path through which said records are moved from said photographic field, a driving means for said copying machine, a feeding means for successively delivering records to said copying machine, and a second driving means for said feeding means, of a control means responsive to a condition of the materials in said apparatus and operative to stop said feeding means, and a second control means responsive to the presence of one or more records in said document path, maintaining operation of the driving means for said copying machine while a record is in said document path, and then rendering said first-mentioned driving means inoperative when no record is in said document path.

21. In an apparatus for handling and copying records, the combination with a copying machine having a photographic field and a document path through which said records are moved from said photographic field, a driving means for said copying machine, a feeding means for successively delivering records to said copying machine, and a second driving means for said feeding means, of a control circuit including a switch responsive to a predetermined condition of said apparatus for rendering said second driving means inoperative, and a second control circuit completed by opening of the first-mentioned control circuit and including a pair of switch members in series and each having an arm extending into said document path and arranged to close said switches only when no record is in said document path whereupon said first-mentioned driving means is rendered inoperative.

22. In an apparatus for handling and copying records, the combination with a copying machine for photographing records, a driving means for said copying machine, the feeding means having a document path and for delivering records to said copying machine, and a second driving means for driving said feeding means, of a control means responsive to the absence of records from said document path and operative to render said second driving means inoperative, and a second control means operative only after operation of the first-mentioned control means and after the records in said copying machine have been photographed therein and for thereafter rendering inoperative the driving means for said copying machine.

23. In an apparatus for handling and copying records, the combination with a copying machine for photographing records, a driving means for said copying machine, a feeding means conveying records in spaced relation through a document path and for delivering records to said copying machine, and a second driving means for driving said feeding means, of a control means responsive to improper spacing of the records moving through said document path and operative to render said second driving means inoperative, and a second control means operative only after operation of the first-mentioned control means and after the records in said copying machine have been photographed therein and for thereafter rendering inoperative the driving means for said copying machine.

24. In an apparatus for handling and copying records, the combination with a copying machine for photographing records, a driving means for said copying machine, a feeding means conveying records in spaced relation through a document path and for delivering records to said copying machine, and a second driving means for driving said feeding means, of a control circuit including a pair of switches connected in parallel and adapted when both of said switches are open to render said second driving means inoperative, a pair of switch operating arms each extending into said document path and in spaced relation therealong so that at least one arm is adapted to be operated to close one of said switches by the normal movement of the spaced records through said feeding means, and a second control circuit completed by the opening of the first-mentioned control circuit and adapted after the records in said copying machine have been photographed to render inoperative the driving means for said copying machine.

25. In an apparatus for handling and copying records, the combination with a copying machine for photographing records, a driving means for said copying machine, a feeding means conveying records in spaced relation through a document path and for delivering records to said copying machine, and a second driving means for driving said feeding means, of a control circuit including a pair of normally open switch assemblies connected in parallel and each having an arm extending into said document path and spaced therealong so at least one of said pair of switches is closed by movement of properly spaced documents through said feeding means and adapted when open to render inoperative said second driving means and said feeding means, a starting circuit including a normally open switch and connected to shunt said switch assemblies so that said control circuit can be manually closed when there are no records in the document path of said feeding means, and a second circuit completed by the opening of the first-mentioned control circuit and adapted after the records in said copying machine have been photographed to render inoperative the driving means therefor.

26. In an apparatus for handling and copying records, the combination with a copying machine for photographing records, a driving means for said copying machine, a feeding means conveying records in spaced relation through a document path and for delivering records to said copying machine, and a second driving means for driving said feeding means, of a control circuit including a manually operable switch and a pair of normally open switch assemblies connected in parallel and each having an arm extending into said document path and spaced therealong so that at least one of said pair of switches is closed by movement of properly spaced records through said feeding means and adapted when open to render inoperative said second driving means and said feeding means, a starting circuit including a normally open switch and connected to shunt said manually operable switch and said pair of switch assemblies so that said control circuit can be manually closed when there are no records in the document path of said feeding means, and a second circuit completed by the opening of the first-mentioned control circuit and adapted after the records have been photographed in said copying machine to render inoperative the driving means therefor.

27. In an apparatus for handling and copying records, the combination with a copying machine for photographing records, a driving means for said copying machine, a feeding means for delivering records to said copying machine, a second driving means for driving said feeding means, and a receiving means for collecting the records discharged by said copying machine and including a member movable to positions corresponding to the number of records in said receiving means, of a control means responsive to movement of said member to a position corresponding to a full condition of said receiving means and operative to render said second driving means inoperative, and a second control means operative only after operation of the first-mentioned control means and after the records in said copying machine have been photographed therein and for thereafter rendering inoperative the driving means for said copying machine.

28. In an apparatus for handling and copying records, the combination with a copying machine for photographing records, a driving means for said copying machine, a feeding means for delivering records to said copying machine, a second driving means for driving said feeding means, and a receiving hopper adapted to receive the records discharged by said copying machine and including a follower plate movable to a position corresponding to a full condition of said hopper, of a control circuit including a switch adapted to be opened by movement of said follower plate to said position corresponding to full condition of said hopper and for rendering said second driving means inoperative, and a second control circuit completed by the opening of the first-mentioned control circuit and adapted after the records in said copying machine have been photographed to render inoperative the driving means for said copying machine.

29. In an apparatus for handling and copying records, the combination with a casing provided with an opening, a photographic copying machine therein and having a document feed with its entrance adjacent said opening, of a carriage assembly hinged to said casing for movement from one position to a second position and including a feeder adapted to feed single records successively and a continuous conveyer adapted to receive each record from said feeder and having an arcuate path with its exit opposite the entrance of said document feed when said assembly is in said one position, said carriage assembly in said one position closing the opening in said casing and in said second position providing simultaneous and convenient access to said document feed and parts of said feeder and conveyer, and adjustable means between said carriage and said casing for varying their angular relation and the relative position of the exit from said conveyor with respect to the entrance to said document feed.

ALVIN E. SCHUBERT.
HARVEY P. HINTZ.

REFERENCES CITED

The following references are of record in the file of this patent:

UNITED STATES PATENTS

| Number | Name | Date |
| --- | --- | --- |
| 1,063,339 | Duncan | June 3, 1913 |
| 1,806,763 | MacCarthy | May 26, 1931 |
| 1,826,992 | Carroll | Oct. 13, 1931 |
| 1,846,324 | Finn | Feb. 23, 1932 |
| 1,939,446 | Hessert | Dec. 12, 1933 |
| 1,957,889 | Hopkins et al. | May 8, 1934 |
| 1,976,346 | Hughey | Oct. 9, 1934 |
| 1,991,028 | Olson et al. | Feb. 12, 1935 |
| 2,161,391 | Schubert | June 6, 1939 |
| 2,185,233 | Stuart | Jan. 2, 1940 |
| 2,186,986 | Nelson | Jan. 16, 1940 |
| 2,251,221 | Cleven | July 29, 1941 |
| 2,292,825 | Dilks, Jr. | Aug. 11, 1942 |